March 10, 1936.  R. P. LANSING  2,033,835
DRIVING MECHANISM
Filed Oct. 7, 1931
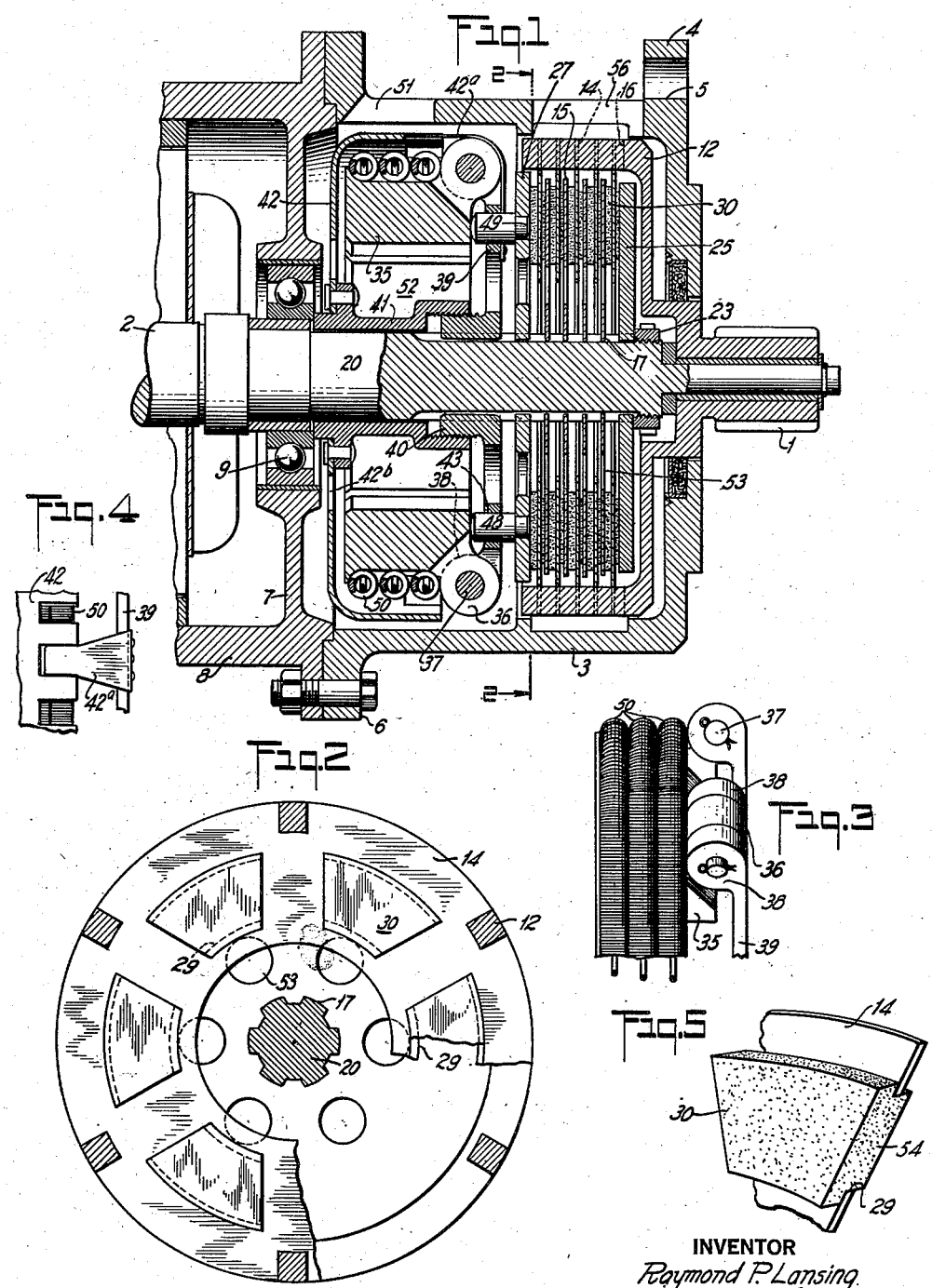
INVENTOR
Raymond P. Lansing
BY
ATTORNEY Patented Mar. 10, 1936

2,033,835

UNITED STATES PATENT OFFICE 2,033,835

DRIVING MECHANISM

Raymond P. Lansing, Montclair, N. J., assignor, by mesne assignments, to Eclipse Aviation Corporation, East Orange, N. J., a corporation of New Jersey Application October 7, 1931, Serial No. 567,517

14 Claims. (Cl. 192—104)

This invention relates to driving mechanisms and more particularly to devices in which relative rotation is possible between the driving and driven members thereof.

An object of the invention is to provide novel means for maintaining the driven member of a driving mechanism at a constant speed of rotation, notwithstanding changes in the speed of rotation of the driving member.

A further object is to provide in a driving mechanism of the foregoing character, novel means operable in response to changes in the speed of the driving member for controlling the speed of the driven member.

A further object is to provide a driving mechanism in which the driving and driven shafts, although normally rotatable at the same speed, are nevertheless capable of rotation at different speeds.

Another object of the invention is to provide a driving mechanism embodying means for varying the ratio between the speed of the driving and driven members without resorting to the use of shiftable gears or similar speed changing devices.

Another object of the invention is to provide in a driving mechanism of the foregoing character, novel centrifugally operated mechanism operating to maintain the driven member at a constant speed.

Another object of the invention is to provide novel friction clutch mechanism for drivably connecting a prime mover, such as an engine, with an electric generator or other member to be driven.

A further object is to provide novel means for carrying away the heat generated by the friction clutch means above referred to.

Another object is to provide a driving mechanism of novel construction in which the component parts are compactly and symmetrically positioned and readily accessible for inspection or repair.

Other objects and advantages to be derived from the use of the invention herein disclosed reside in the interrelation and method of operation of the parts, and will become apparent upon inspection of the following specification when read with reference to the accompanying drawing wherein the preferred embodiment of the invention is illustrated. It is to be expressly understood, however, that the drawing is for the purpose of illustration only, and is not to be construed as a definition of the limits of the invention, reference being had for this purpose to the appended claims.

In the drawing,

Fig. 1 is a central longitudinal section through a device embodying the invention;

Fig. 2 is a transverse sectional view taken along the line 2—2 of Fig. 1;

Fig. 3 is a view in elevation of a portion of the control mechanism;

Fig. 4 is a detailed view of an adjusting feature; and

Fig. 5 is a perspective view of one of the parts.

Referring to the drawing and particularly to Fig. 1, the invention is illustrated as embodied in a driving mechanism comprising a driving member 1, a driven shaft 2, and a plurality of intermediate members of novel construction drivably connecting the members 1 and 2 and enclosed within a casing 3 having a flange 4 provided with an opening 5 through which suitable fastening means (not shown) may be inserted for attachment to a suitable support. At the opposite end the casing 3 is preferably provided with a second flange 6 through which pass bolts adapted to hold an end plate 7 which thus serves as a dividing wall between the casing 3 and the housing 8 of a generator or other device to be driven, as well as serving as a support for a ball bearing member 9 in which the driven shaft 2 is rotatably mounted.

As above suggested, the invention contemplates the provision of novel means for drivably connecting the shafts 1 and 2 to permit relative rotation of the two shafts through the instrumentality of novel friction driving connections. Such driving connections preferably take the form of a driving barrel 12 drivably connected to the driven member 2 by a set of friction plates which in the form shown consists of a plurality of inter-leaving metallic discs 14 and 15, the former being splined to the splines or slots 16 in the barrel 12 and the latter being similarly splined as indicated at 17 to the central portion 20 of the driven member 2.

The shaft portion 20 has threaded thereon a castellated nut 23 adapted to hold in place the abutment plate 25 in position to resist axial movement of the clutch discs, a similar plate 27 being provided at the opposite end of the clutch assembly, to retain the clutch discs in frictional engagement, the axial pressure thereon depending upon the action of the novel control means to be described. The discs 14 are provided with angularly spaced openings 29, as shown best in Fig. 2, in which openings are inserted the segmental friction blocks 30 constructed of suitable gripping material such as carbon, the discs 15 with which the blocks 30 have contact, being preferably of metal to permit their being splined to the driven member 20.

The novel control means for maintaining a predetermined axial pressure on the friction plates and driving blocks preferably includes a plurality of weighted members 35 having apertured ears 36 for reception of pins 37 providing a pivotal mounting for the weights in the corresponding ears 38 provided at equal intervals about the circumference of a plate 39, the latter having a hub 40 the interior surface of which is splined to the shaft 20, to be movable axially thereof and to rotate in unison therewith. The member 39 is normally held in the position to which it is adjusted relative to plate 27, by the adjusting sleeve 41 rotatably mounted on shaft 2 and threadedly engaging the hub 40, and at its opposite end receiving a cage 42 the outer rim of which is slotted (Figs. 1 and 4) to receive a tapered retainer strip 42a extending from plate 39. The plate 39 is further provided with openings 43 in line with the weights 35 to permit the passage therethrough of studs 48, the ends of which are embedded in the plate 27, as indicated at 49.

Surrounding the assembly of weights 35, a plurality of coiled springs 50 engage the outer arcuate surface thereof and exert thereupon an inwardly directed pressure which yieldably holds the weights in the position shown in Fig. 1, in which position the lateral faces thereof contact the ends of the studs 48 and thus hold the plate 27 against movement out of position of maximum axial pressure upon the clutch members 14 and 15, thus insuring a virtually positive driving connection between the barrel 12 and sleeve 13, so long as the former rotates within a predetermined speed. In the event however of an increase in speed above such predetermined value, the resultant increase in centrifugal force tending to move the weights 35 outward, overcomes the oppositely directed force of the springs 50 and produces an oscillatory movement of the weights about their pivotal supports 38 and a consequent relaxation of the force resisting expansion of the clutch plates out of frictional engagement. Such action permits the friction blocks 30 to slip along the disc surfaces, and the shaft 20 will lag behind the barrel 12 in its rotary movement and thus reduce the centrifugal force acting on the weights until such force is brought back to the value at which it is completely balanced by the oppositely directed force of the springs 50, whereupon the condition of virtual positive drive is again established. It will be noted that the radially flanged portion of member 42 serves to prevent an excess expansive condition of springs 50 due to centrifugal action of weights 35.

The cycle of events just described will of course be repeated on every occasion when the rotating parts depart from the predetermined normal speed. Hence it is apparent that on every such tendency the control means above described will come into action to nullify such tendency and thereby maintain the driven shaft 2 at a substantially constant speed.

Novel means are provided for ventilating the assembly and for removing the heat generated by the friction of the parts, particularly the surfaces of the friction members. As shown best in Figs. 1 and 2, such means comprises a plurality of openings 51 on the casing 3 in positions adjacent the springs 50, permitting the entry of cooling air which is free to pass through the openings 42b in the plate 42, and into the relatively large annular space 52, from which space it enters the openings 53 in discs 15. Here there is imparted thereto a rather high velocity causing a turbulent action thereof as the air sweeps along and between the successive friction blocks 30, the opposing edges 54 (Fig. 5) of which have an agitating effect on the air similar to the effect produced by the vanes of a blower or supercharger. After passing along the edges of the carbon blocks and carrying off the excess heat generated therein, the heated air passes out through suitable openings 56 in the casing 3.

There is thus provided a novel driving mechanism which is effective to maintain a driven member at constant speed, within desired limits, by the use of a compact, symmetrically arranged mechanism which entails the use of comparatively few parts, which is relatively inexpensive to manufacture, readily assembled or disassembled, and which possesses the further desirable quality that it can be adapted to a variety of uses and applications. Thus, for example, although especially useful for driving a generator or other dynamo electric machine or accessory of an automotive vehicle, it may also be applied as a drive for any machinery where a constant speed is desirable and where the prime mover is subject to variations in speed.

While the embodiment of the invention herein illustrated possesses a high degree of merit from a practical as well as from other viewpoints, it is nevertheless contemplated that changes in construction and arrangement of parts will suggest themselves to persons skilled in the art in the light of the foregoing disclosure and it is to be understood that such means are within the scope of the invention herein disclosed. Thus, in place of the direct connection shown at 17 between the friction members and the drive shaft 2, any suitable gear train may be interposed to produce a predetermined driving ratio between the driving and driven members, while at the same time maintaining the advantages of compactness and self-cooling feature of the present invention.

Likewise other changes may be made in the form, details of construction, arrangement of parts and the uses to which they are applied, without departing from the spirit of the invention, or the scope of the appended claims.

What is claimed is:

1. A driving mechanism comprising a driving drum, a driven shaft concentric with said drum, connecting means including friction units having alternate operative connection with said drum and shaft, a plurality of rotatable and pivotally mounted weights in axially spaced relation to said friction units, resilient means acting through said weights to normally maintain a predetermined clamping pressure on said units, said resilient means surrounding and engaging all of said weights and operative to prevent movement thereof about their pivotal axes so long as their rotary speed is maintained within a predetermined range.

2. A driving mechanism comprising a driving drum, a driven shaft concentric with said drum, connecting means including friction units having alternate operative connection with said drum and shaft, a plurality of rotatable and pivotally mounted weights in axially spaced relation to said friction units, resilient means acting through said weights to normally maintain a predetermined clamping pressure on said units, said resilient means surrounding and engaging all of said weights and operative to prevent movement thereof about their pivotal axes so long as the rotary speed thereof is maintained within a predetermined range, and means for removing the heat generated by the interengagement of said friction units.

3. A constant speed drive, comprising a driving member, a driven member concentric therewith, a plurality of friction plates constituting a driving connection between said members, and a plurality of toroidal springs encircling one of said members and laterally spaced from said friction plates, said springs operating through the instrumentality of the hereinafter recited centrifugal means to maintain said driven member in rotation at a substantially constant speed by the exertion of a clamping effect on said friction plates, and centrifugal means rotatable with said driven member to oppose the clamping effect of said springs.

4. In a device of the class described, a driving member, a driven member concentric therewith, a plurality of friction plates constituting a driving connection between said members, a plurality of toroidal springs encircling said driven member and laterally spaced from said friction plates, said springs operating through the instrumentality of the hereinafter recited weighted members to exert a clamping effect on said friction plates, and means comprising a plurality of weighted members maintained in spaced relation about said driven member and adapted to rotate therewith, to oppose the clamping effect of said springs.

5. In a device of the class described, a driving member, a driven member concentric therewith, a plurality of friction plates constituting a driving connection between said members, means comprising a plurality of toroidal springs encircling said driven member and laterally spaced from said friction plates for operating through the instrumentality of the hereinafter recited speed responsive means to exert a predetermined lateral pressure on said friction plates, and speed responsive means for rendering said springs ineffective.

6. In a device of the class described, a driving member, a driven member concentric therewith, a plurality of friction plates constituting a driving connection between said members, a plurality of toroidal springs encircling said driven member and laterally spaced from said friction plates, said springs operating through the instrumentality of the hereinafter recited speed responsive means to exert a clamping effect on said friction plates, and speed responsive means for rendering said springs ineffective.

7. In a device of the class described, a driving member, a driven member concentric therewith, a plurality of friction plates constituting a driving connection between said members, a plurality of toroidal springs encircling said driven member and laterally spaced from said friction plates, said springs operating through the instrumentality of the hereinafter recited weighted members to exert a clamping effect on said friction plates, and means comprising a plurality of weighted members maintained in spaced relation about said driven member for rendering said springs ineffective.

8. In a device of the class described, a driving member, a driven member concentric therewith, a plurality of friction plates constituting a driving connection between said members, a plurality of toroidal springs encircling said driven member and laterally spaced from said friction plates, said springs operating through the instrumentality of the hereinafter recited weighted members to exert a clamping effect on said friction plates, and weighted means pivotally suspended from said driven member to normally prevent lateral expansion of said clutch plates, and further operating to render said friction means ineffective.

9. A constant speed drive, comprising a driving member, a driven member concentric therewith, a plurality of self-cooling friction plates in the same and parallel planes constituting a driving connection between said members, a plurality of toroidal springs encircling said driven member and laterally spaced from said friction plates said springs acting through the instrumentality of the hereinafter recited centrifugal means to exert predetermined lateral pressure on said friction plates, and thereby maintaining said driven member in rotation at a substantially constant speed and centrifugal means rotatable with said driven member to oppose the clamping effect of said springs.

10. A constant speed drive, comprising a driving member, a driven member concentric therewith, a plurality of self-cooling friction plates in the same and parallel planes constituting a driving connection between said members, a plurality of toroidal springs encircling said driven member and laterally spaced from said friction plates, said springs operating through the instrumentality of the hereinafter recited centrifugal means to exert a clamping effect on said friction plates, and thereby maintaining said driven member in rotation at a substantially constant speed and centrifugal means rotatable with said driven member to oppose the clamping effect of said springs.

11. In a device of the class described, a driving member, a driven member concentric therewith, a plurality of friction plates constituting a driving connection between said members, a plurality of coiled springs encircling said driven member and laterally spaced from said friction plates, said springs operating through the instrumentality of the hereinafter recited weighted members to exert a clamping effect on said friction plates, means comprising a plurality of weighted members maintained in spaced relation about said driven member and adapted to rotate therewith to oppose the clamping effect of said springs, and means for circulating a cooling medium from a space between said driven member and springs through the spaces between successive clutch plates to prevent undue heating thereof.

12. A constant speed drive comprising a driving member, a driven member, a plurality of friction elements constituting a driving connection between said members, speed responsive means operatively associated with but spaced from said friction elements, and a toroidal spring also spaced from said friction elements and exerting predetermined pressure on said speed responsive means and thereby cooperating therewith to maintain said driven member in rotation at a substantially constant speed.

13. A constant speed drive comprising a driving member, a driven member, a plurality of friction elements constituting a driving connection between said members, speed responsive means operatively associated with but spaced from said friction elements, and a toroidal spring encircling one of said members and exerting predetermined pressure on said speed responsive means and thereby cooperating therewith to maintain said driven member in rotation at a substantially constant speed.

14. A constant speed drive comprising a driving member, a driven member concentric therewith, a plurality of friction plates constituting a driving connection between said members, a spring encircling one of said members and laterally spaced from said friction plates, said spring operating to exert a radially directed force upon the hereinafter recited centrifugal means to maintain said driven member in rotation at a substantially constant speed by the exertion of a clamping effect on said friction plates, and centrifugal means rotatable with said driven member to oppose the clamping effect of said spring.

RAYMOND P. LANSING.